(12) United States Patent
Dunbar et al.

(10) Patent No.: US 8,050,270 B2
(45) Date of Patent: Nov. 1, 2011

(54) TRANSPARENT BYPASS AND ASSOCIATED MECHANISMS

(75) Inventors: Linda Dunbar, Plano, TX (US); Peter Ashwood-Smith, Gatineau, CA (US); Robert Sultan, Somers, NY (US); T. Benjamin Mack-Crane, Downers Grove, IL (US); Lucy Yong, McKinney, TX (US); Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 277 days.

(21) Appl. No.: 12/431,650

(22) Filed: Apr. 28, 2009

(65) Prior Publication Data

US 2009/0268739 A1 Oct. 29, 2009

Related U.S. Application Data

(60) Provisional application No. 61/048,396, filed on Apr. 28, 2008.

(51) Int. Cl.
*H04L 12/28* (2006.01)
(52) U.S. Cl. ........ 370/392; 370/218; 370/242; 370/256; 370/395.5; 370/401; 709/224; 709/231
(58) Field of Classification Search .................. 370/218, 370/242, 256, 389, 390, 392, 395.5, 401; 709/224, 231
See application file for complete search history.

(56) References Cited

U.S. PATENT DOCUMENTS

| | | | | |
|---|---|---|---|---|
| 6,665,273 | B1 * | 12/2003 | Goguen et al. | 370/252 |
| 6,683,874 | B1 * | 1/2004 | Nagami et al. | 370/392 |
| 6,862,288 | B2 * | 3/2005 | Sharma et al. | 370/403 |
| 6,895,441 | B1 * | 5/2005 | Shabtay et al. | 709/238 |
| 7,058,845 | B2 * | 6/2006 | Fujita | 714/4.2 |
| 7,209,434 | B2 * | 4/2007 | Kano et al. | 370/216 |
| 7,502,314 | B2 * | 3/2009 | Shimizu | 370/227 |

(Continued)

FOREIGN PATENT DOCUMENTS

CN 1747456 A 3/2006

(Continued)

OTHER PUBLICATIONS

Foreign Communication From a Related Counterpart Application—International Search Report and Written Opinion, PCT/CN2009/071524, Aug. 6, 2009, 11 pages.

(Continued)

*Primary Examiner* — Ayaz Sheikh
*Assistant Examiner* — Andrew C Lee
(74) *Attorney, Agent, or Firm* — Conley Rose, P.C.; Grant Rodolph (57) ABSTRACT

A network component comprising at least one processor configured to implement a method comprising transparently snooping a path control message comprising a first path identifier, wherein the path control message is sent between a plurality of routers and is not intended for the network component, analyzing a plurality of frames each comprising a second path identifier, and diverting at least some of the frames away from at least one of the routers, wherein the second path identifier in the diverted frames matches the first path identifier. Included is a method comprising configuring a bypass path by snooping a control frame comprising a label switched path (LSP) identifier, and routing a plurality of data frames associated with the LSP identifier to the bypass path without routing any subsequent control frames associated with the LSP identifier to the bypass path.

20 Claims, 3 Drawing Sheets

U.S. PATENT DOCUMENTS

| | | | | |
|---|---|---|---|---|
| 7,570,604 | B1 * | 8/2009 | Aggarwal et al. | 370/256 |
| 7,733,788 | B1 * | 6/2010 | Michalski et al. | 370/242 |
| 7,839,780 | B2 * | 11/2010 | Natarajan et al. | 370/230.1 |
| 7,855,950 | B2 * | 12/2010 | Zwiebel et al. | 370/216 |
| 2003/0229700 | A1 | 12/2003 | Moore et al. | |
| 2005/0220030 | A1 * | 10/2005 | Nagami et al. | 370/241 |
| 2006/0050648 | A1 | 3/2006 | Eydelman | |
| 2006/0203720 | A1 * | 9/2006 | Kano | 370/228 |
| 2007/0280242 | A1 * | 12/2007 | Rajagopalan et al. | 370/392 |
| 2008/0049610 | A1 * | 2/2008 | Linwong et al. | 370/225 |
| 2009/0122707 | A1 * | 5/2009 | Weinman | 370/237 |
| 2010/0208733 | A1 * | 8/2010 | Zhao et al. | 370/390 |

FOREIGN PATENT DOCUMENTS

| | | |
|---|---|---|
| CN | 101035081 A | 9/2007 |
| EP | 1379036 A1 | 1/2004 |

OTHER PUBLICATIONS

Foreign Communication From a Related Counterpart Application—European Search Report, EP Application 09737688.3, Feb. 2, 2011, 13 pages.

Ibe, et al., "Multilayer Traffic Engineering GMPLS Network Architecture Using Rapid Wavelength Tunable Optical Transceiver," Proc. World Telecommunication Congress, May 2006, pp. 1-8.

Oki, et al., "Performance Evaluation of Dynamic Multi-Layer Routing Schemes in Optical IP Networks," IEICE Transactions on Communications, Communications Society, Tokyo, Japan, vol. E87-B, No. 6, Jun. 2004, pp. 1577-1583.

Pan, Ed., et al., "Fast Reroute Extensions to RSVP-TE for LSP Tunnels", RFC 4090, May 2005.

* cited by examiner

TRANSPARENT BYPASS AND ASSOCIATED MECHANISMS

CROSS-REFERENCE TO RELATED APPLICATIONS

The present application claims priority to U.S. Provisional Patent Application No. 61/048,396, filed Apr. 28, 2008 by Linda Dunbar et al., and entitled "Transparent By-Pass and the Mechanisms to Enable It," which is incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames from one node to another node across the network without using pre-configured routes on intermediate nodes. Other networks may forward the data frames from one node to another node across the network along pre-configured or pre-established paths.

Bypasses, such as express bypasses, are sometimes used in packet networks to create a direct path between two nodes when the traffic volume between the two nodes exceeds certain capacity. For example, when traffic volume between two Provider Edge (PE) nodes is close to a capacity limit, an express bypass can be created between the two PE nodes to reduce switching burden on the intermediate (or transit) nodes in the middle of the network. Unfortunately, bypasses change the topology of the network and can lead to undesirable changes in routing behavior within the network.

SUMMARY

In one embodiment, the disclosure includes a network component comprising at least one processor configured to implement a method comprising transparently snooping a path control message comprising a first path identifier, wherein the path control message is sent between a plurality of routers and is not intended for the network component, analyzing a plurality of frames each comprising a second path identifier, and diverting at least some of the frames away from at least one of the routers, wherein the second path identifier in the diverted frames matches the first path identifier.

In another embodiment, the disclosure includes a system comprising a packet-aware transport box configured to establish and tear down a transparent bypass for a data path managed by a router by snooping on the data path's path control messages, snoop a plurality of frames associated with the data path and intended for the router, determine whether at least some of the frames should bypass the router, and forward any frames that should bypass the router to the transparent bypass, wherein the forwarding does not substantially impact the condition of the data path.

In a third embodiment, the disclosure includes a method comprising configuring a bypass path by snooping a control frame comprising a label switched path (LSP) identifier, and routing a plurality of data frames associated with the LSP identifier to the bypass path without routing any subsequent control frames associated with the LSP identifier to the bypass path.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method for allowing routers to handle an increased volume of traffic without upgrading router's capacity. Specifically, a transparent bypass method is disclosed wherein packet-aware transport boxes associated with the routers snoop the control messages processed by the router to determine the paths that traverse the router. The packet-aware transport boxes build a table of associated paths and snoop the router's incoming data frames to determine whether any of the incoming data frames are associated with the paths in the table. Any data frames associated with the paths in the table are not sent to the router but are instead forwarded by the packet-aware transport boxes to another destination, such as the next node on the path. In contrast, the packet-aware transport box forwards all control frames to the router, regardless of whether they are associated with the paths in the table or not. By doing so, the routers are able to maintain the paths in a normal fashion, but experience a reduced volume of data frames.

Figure 1:
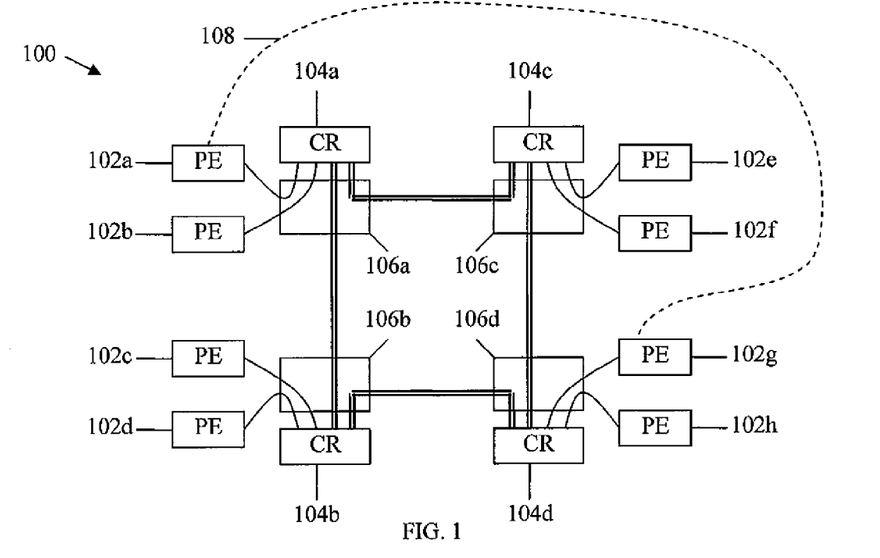
FIG. 1 is a schematic diagram of an embodiment of a core network implementing express bypass.

FIG. 1 illustrates an embodiment of a network 100. The network may comprise a plurality of provider edges (PEs) 102a-102h (collectively, 102), a plurality of core routers (CRs) 104a-104d (collectively, 104), and a plurality of transport boxes 106a-106d (collectively, 106). The PEs 102 may be coupled to the CRs 104 as shown by the single solid lines in FIG. 1, while the CRs 104 may be coupled to each other as shown by the double solid lines in FIG. 1. The communications paths between the PEs 102 and the CRs 104 (including those between the CRs 104) may be electrical or optical communications paths. Typically, the communications paths between the CRs 104 have more capacity than the communications paths between the PEs 102 and the CRs 104. For example, the communications paths between the CRs 104 may be wavelength division multiplexed to create a capacity of about 200 gigabits per second (Gbps or G), while the communications paths between the PEs 102 and the CRs 104 may only be single wavelength channels having a capacity of about 10 Gbps.

The network 100 may be any communications system that may be used to transport data between PEs 102 and/or CRs 104. For example, the network 100 may be a wireline network or an optical network, such as a backbone, a provider, and an access networks. Such networks typically implement Synchronous Optical Networking (SONET), Synchronous Digital Hierarchy (SDH), Ethernet, Internet Protocol (IP), Asynchronous Transfer Mode (ATM), Frame Relay, optical transport network (OTN) or other protocols. Alternatively, the network 100 may be a wireless network. The network 100 may transport traffic using multi-protocol label switching (MPLS) LSPs, Ethernet Switched Paths (ESPs), and/or virtual local area networks (VLANs). The traffic may comprise connectionless or switched traffic, also referred to as service instances or non-TE traffic. The traffic may also comprise connection-oriented, also referred to as traffic engineered (TE) traffic. Each of the standards described herein is incorporated herein by reference.

The PEs 102 may be any devices, components, or networks that exchange data with the CRs 104. The PEs 102 may be routers, switches, or bridges, and may include provider core bridges (PCBs) and/or provider edge bridges (PEBs). The PEs 102 may implement one or more protocols, including MPLS, open shortest path first (OSPF), or border gateway protocol (BGP). The PEs 102 may establish MPLS LSPs with other devices, and as such may serve as the origin or termination point of a LSP. In embodiments, the PEs 102 may reside at the edge of or interface with devices that reside at the edge of a network provider's domain. Finally, the PEs 102 may comprise transport boxes similar to the transport boxes 106 described herein.

The CRs 104 may be any devices or components that exchange data with the PEs 102 and each other. For example, the CRs 104 may be routers, switches, or bridges, including backbone core bridges (BCBs) and/or backbone edge bridges (BEBs). In addition, the CRs 104 may implement one or more protocols, including MPLS, BGP, or OSPF. The CRs 104 may maintain MPLS LSPs, and as such may serve as an intermediate or transit node along a LSP. In embodiments, the CRs 104 may reside within the central region of a network provider's domain, e.g. not at the edge of the provider's domain.

Each CR 104 may be coupled to a transport box 106. The transport box 106, sometimes referred to as an optical transport box, may be a device that interfaces between a physical layer, such as an electrical or optical layer, and a higher layer, such as a media access control (MAC) layer, MPLS layer, or IP layer. Specifically, the transport box 106 may snoop the communications originated by and destined for the CR 104, and implemented transparent bypass as described herein.

In some cases, a network operator may implement express bypass in the network 100. For example, when traffic volume between two PEs 102, e.g. PE 102a and PE 102g, exceeds a threshold, a physical bypass 108 may be established between the PEs 102. The physical bypass 108 may comprise a new path between PE 102a and PE 102g. While the establishment of the physical bypass 108 is useful in reducing traffic flow through the CRs 104, express bypass is not without limitations. For example, the physical bypass 108 can only be established when the PEs 102 reside within the same administrative domain. In addition, the physical bypass 108 creates adjacency between PE 102a and PE 102g, which causes topology and route cost changes within the network. Such changes eventually lead to an unwanted increase in traffic on the express bypass 108 and other undesirable changes to traffic within the network 100.

Figure 2:
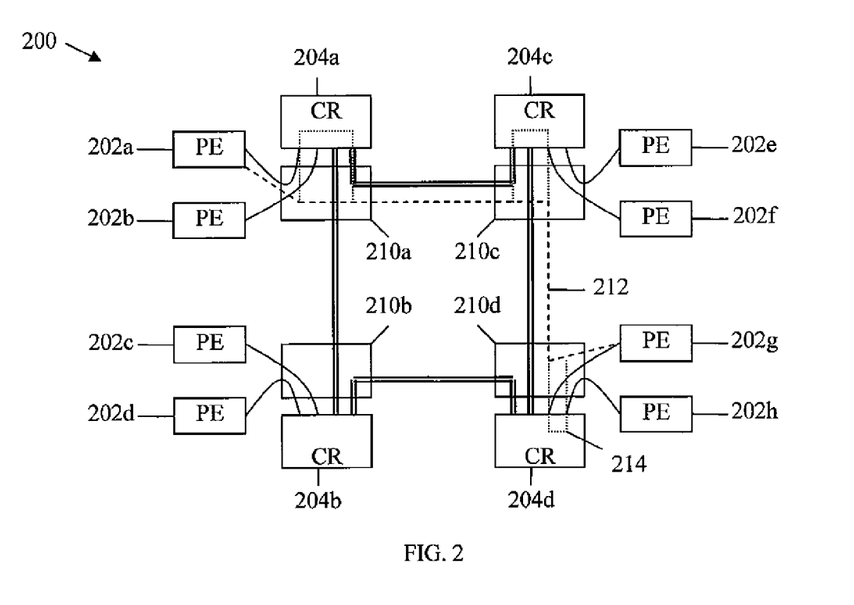
FIG. 2 is a schematic diagram of an embodiment of a core network implementing transparent bypass.

FIG. 2 illustrates an embodiment of a network 200 implementing transparent bypass. The network 200, PEs 202, and CRs 204 may be substantially the same as the network 100, PEs 102, and CRs 104 described above. However, the CRs 204 (and optionally the PEs 202) within the network 200 comprises packet-aware transport boxes 210a-210d (collectively, 210) instead of the transport boxes 106. The packet-aware transport boxes 210 may be similar to the transport boxes 106, but may comprise additional functionality, such as the ability to analyze and forward frames received from the PEs 202 and the CRs 204, e.g. without passing those frames to the CR 204. After analyzing the frames, the packet-aware transport boxes 210 may construct a forwarding table and decide whether to implement transparent bypass on any subsequently data frames. The packet-aware transport box may be configured to create the transparent bypass after snooping a complete set of path reservation and confirmation messages among the routers. The transparent bypass may occur at the layer one, which includes fiber, wavelength, SONET/SDH/OTN path, and may comprise a statistically multiplexed packet header. Alternatively, transparent bypass may occur at layer two, which includes ESPs in a VLAN and LSPs. Finally, transparent bypass may be implemented at any time, but is particularly useful when the traffic volume going through CRs 204 is approaching or about to exceed certain threshold or the CRs' 204 link capacity. Finally, the packet-aware transport box may be configured to cease forwarding of the frames to the transparent bypass when a path maintenance message is not received within a predetermined time interval, when a path termination message is received, or when instructed to cease forwarding the frames to the transparent bypass by a network operator.

During transparent bypass, the packet-aware transport boxes 210 may analyze the frames received from the PEs 202 and the CRs 204 and determine whether the frames are control frames or data frames. If the frames are control frames, the packet-aware transport boxes 210 may forward the control frames to the CR 204 for routing and/or processing regardless of whether the control frames are associated with one the transparent bypass paths. Control frames may be used for establishing, maintaining, and removing paths, such as LSPs, in the network, and may comprise IP/MPLS control protocol data units (PDUs). Because the packet-aware transport boxes 210 have visibility into these frames, the packet-aware transport boxes 210 may maintain a forwarding database of paths associated with its CR 204. As such, when the packet-aware transport boxes 210 receive a data frame, they may determine whether the data frame is associated with one of the paths, and if so, forward the data frame to their corresponding transparent bypass, e.g. without ever forwarding the data frame to the CR 204. As such, the dashed line 212 may represent a data frame's path from PE 202a to PE 202g, e.g. the bypass of CRs 204a, 204c, and 204d. In contrast, the dotted line 214 may represent how a control frame's path from PE 202a to PE 202g deviates from the dashed line 212, e.g. the control frame's path goes through of CRs 204a, 204c, and 204d.

Figure 3:
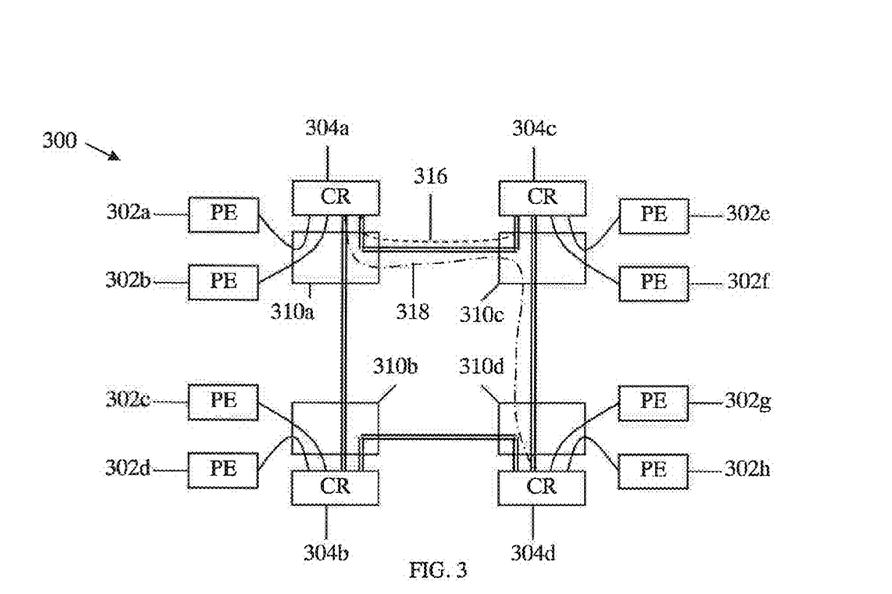
FIG. 3 is a schematic diagram of another embodiment of a network implementing transparent bypass.

FIG. 3 illustrates an embodiment of a network 300 implementing transparent bypass. The network 300, PEs 302, CRs 304, and packet-aware transport boxes 310 may be substantially the same as the network 200, PEs 202, CRs 204, and packet-aware transport boxes 210 described above. However, the network 300 may be a logical full mesh core IP network, and as such may allow the packet-aware transport boxes 310 to establish a one-hop transport path between any two CRs 304. For example, if the CRs 304 comprise Ethernet interfaces to the packet-aware transport boxes 310, sometimes called packet-optical transport platforms (P-OTP) as is the case in Ethernet over SONET/SDH applications, then VLANs can be used as channels between the CRs 304. Dashed lines 316 and 318 represent such one-hop transport paths between CRs 304. When implementing the transparent bypass in a full mesh network, the packet-aware transport boxes 310 may utilize these one-hop transport paths, which further reduces the traffic volume at the intermediate CRs 304, which act as intermediate label switched routers (LSRs) or transit routers. To the transit routers, the use of the one-hop transport paths is a double benefit because the transit routers see a traffic reduction on both their input ports and their output ports, e.g. when traffic is sent on path 318, CR 304c sees a reduction in traffic associated with ports connected to CR 304a and CR 304d. Note that while the benefit is realized for CR-CR ports, it does not affect the amount of traffic on PE ports. As such, the PEs 302 will eventually have to upgrade their port capacity to handle the increased data to/from the PEs 302. Finally, most CR to P-OTP interfaces are 10 Gbps, which is usually required for any CR 304 interconnection. In order to show any significant advantage of logical mesh connections established by P-OTP, the CR to P-OTP interface may need to be as high as 40 Gbps or 100 Gbps, which is not currently commercially available in many networks.

There are many methods by which the packet-aware transport boxes can implement the transparent bypass. For example, if LSPs are calculated by a path computation element (PCE), then the PCE can send the transparent bypass information to the packet-aware transport box. In some instances, the PCE may comprise an upper layer PCE, such as a MPLS or IP layer PCE, and a lower layer PCE, such as a packet transport network (PTN), optical transport network (OTN), or a wavelength division multiplexed (WDM) layer PCE. In such cases, the upper layer PCE may consult the lower layer PCE for lower layer topology information. Alternatively, if there are pre-established LSPs, then the LSP forwarding table can be manually provisioned on the packet-aware transport boxes. However, it is expected that the transparent bypass will most often be implemented by allowing the packet-aware transport boxes to snoop the MPLS control protocol PDUs and establish LSP forwarding table accordingly.

Figure 4:
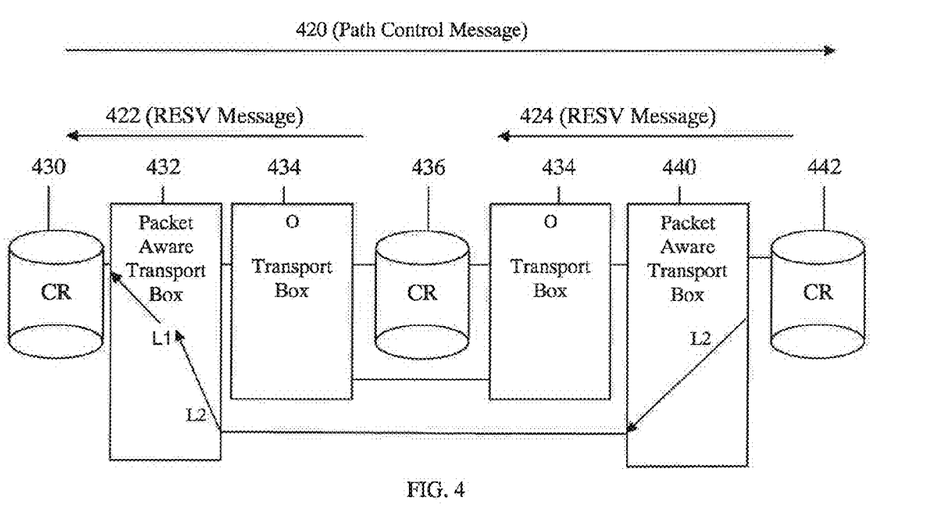
FIG. 4 is a schematic diagram of an embodiment of a method for establishing transparent bypass.

FIG. 4 illustrates a method by which the packet-aware transport boxes snoop the MPLS control protocol PDUs and establish LSP forwarding table. Initially, a path control message 420 is sent from a first core router, e.g. CR 430, to a second core router, e.g. CR 442. The path control message 420 may be, for example, a resource reservation protocol—traffic engineering (RSVP-TE) message or label distribution protocol (LDP) message. The path control message 420 may contain a specific keyword key, perhaps a wildcard, that triggers the below-described actions when it is detected during the snooping. The key may be an ASCII string or substring, and may be inserted at CR 430 by a network administrator. When the packet-aware transport box 432 receives the path control message 420, the packet-aware transport box 432 may ensure that the path control message 420 is requesting an appropriate object, such as a Record Route Object (RRO), and if so, forward the message to the CR 442.

After the CR 442 processes the path control message 420, the CR 442 may generate a path reserved (RESV) confirmation message 424 comprising the key, a RRO label (L2), and a RESV destination. Upon receiving the RESV message 424, the packet-aware transport box 440 programs its cross-connect fabric to map the L2 label used on the hop it is snooping to its direct tunnel to the destination, which may be the packet-aware transport box 432. This action effectively sets up the transparent bypass. As such, the packet-aware transport box 440 will subsequently strip the L2 label off any data frames associated with the LSP and directs the data frames to a transport tunnel that terminates at the final snooping hop of the RSVP-TE path, namely the packet-aware transport box 432. The RESV message 424 will progress, hop by hop, across the intermediate CR 436 and its transport boxes 434, which may be packet-aware transport boxes.

When the packet-aware transport box 432 receives the final RESV message 424, the packet-aware transport box 432 may look at the RRO, find the label L2, for example by looking at the first recorded hop/label in the RRO, and program its cross-connect to forward label L2 from the tunnel to the packet-aware transport box 440 through its snooping interface. The packet-aware transport box 440 may also switch the label to the proper label (L1) for this hop as seen in the Label object of the RESV message 422. Thus, the RRO allows direct mapping of the first and last hops by the packet-aware transport boxes. As such, a multi-hop RSVP-TE path is turned into a three-hop path (442-440-432-430), the middle one of which is a direct detour bypassing all the inner hops.

When there are multiple optical links between two packet-aware transport boxes, there may be multiple options for mapping the LSPs to the transparent bypass path. For example, equal cost multi-path (ECMP) can be used to automatically map some LSPs to one of the transparent bypass paths. Alternatively, a network administrator may manually configure some LSPs to a fixed transparent bypass path.

Occasionally, faults may be detected along the bypass path. For example, a fault may be detected on a physical port associated with the transparent bypass by a packet-aware transport box. If a fault is detected, the packet-aware transport box may disable the transparent bypass function for the affected LSPs. As such, the data frames associated with the LSPs whose transparent bypass is disabled may be forwarded to CRs as if the transparent bypass never existed. When the fault is eventually detected by the router, the router may trigger fast re-route to get around the faulty link(s). The router that detects the fault may then notify the source of the LSP to establish a new LSP and switch all the data to the newly established LSPs. During the process of the new LSP being established, transparent bypass can be created by the packet aware transport boxes in the network. When the source router of the LSP switches data to the newly established data path, there may not be any control or data frames on the old LSP. As such, the packet-aware transport box may tear down transparent bypass accordingly after the timer for the path keep-alive message expires.

The packet-aware transport box may have many ports. For example, 20-40 ports are commonly used in transport boxes. When a failure occurs, only the data frames traversing through the faulty port may be sent to the CR. Even with the increase in traffic to the CR, the amount of frames sent to CR is still much less than the total amount of frames traversing all of the ports.

As described above, there are significant differences between express bypass and transparent bypass. Transparent bypass may generally be implemented for data frames on selected LSPs to reduce the data volume traversed through the CR's ports. As such, the traffic volume to and from the PEs can grow without increasing the port capacity on adjacent CRs. In addition, transparent bypass allows the PEs to continue peering with their original CRs. As such, there is no route or topology change to the routers, which means the transparent bypass does not affect the calculations for other routes. In other words, transparent bypass does not create any new adjacencies, and thus will not change the costs to other routes, cause any unexpected traffic switches to the newly established bypass, or cause other routers to change their forwarding tables. Finally, in transparent bypass all of the control data frames get sent to CRs, and as such when transparent bypass is disabled, all of the data flows are defined at the CRs, and the network acts as if the packet-aware transport boxes did not exist.

In some embodiments, the network may require special configuration to implement the transparent bypass. For example, the packet-aware transport box may need to be able to differentiate control frames, e.g. IP/MPLS control PDUs, from data frames, e.g. data PDUs. In addition, the packet-aware transport box may only transparently bypass data frames associated with paths that are implementing transparent bypass. In other words, data frames associated with paths not implementing transparent bypass, control frames, and other types of frames continue to be sent to the CR. Finally, the packet-aware transport box may have to manipulate the MPLS labels on the data frames as if the data frames went through the CR.

Figure 5:
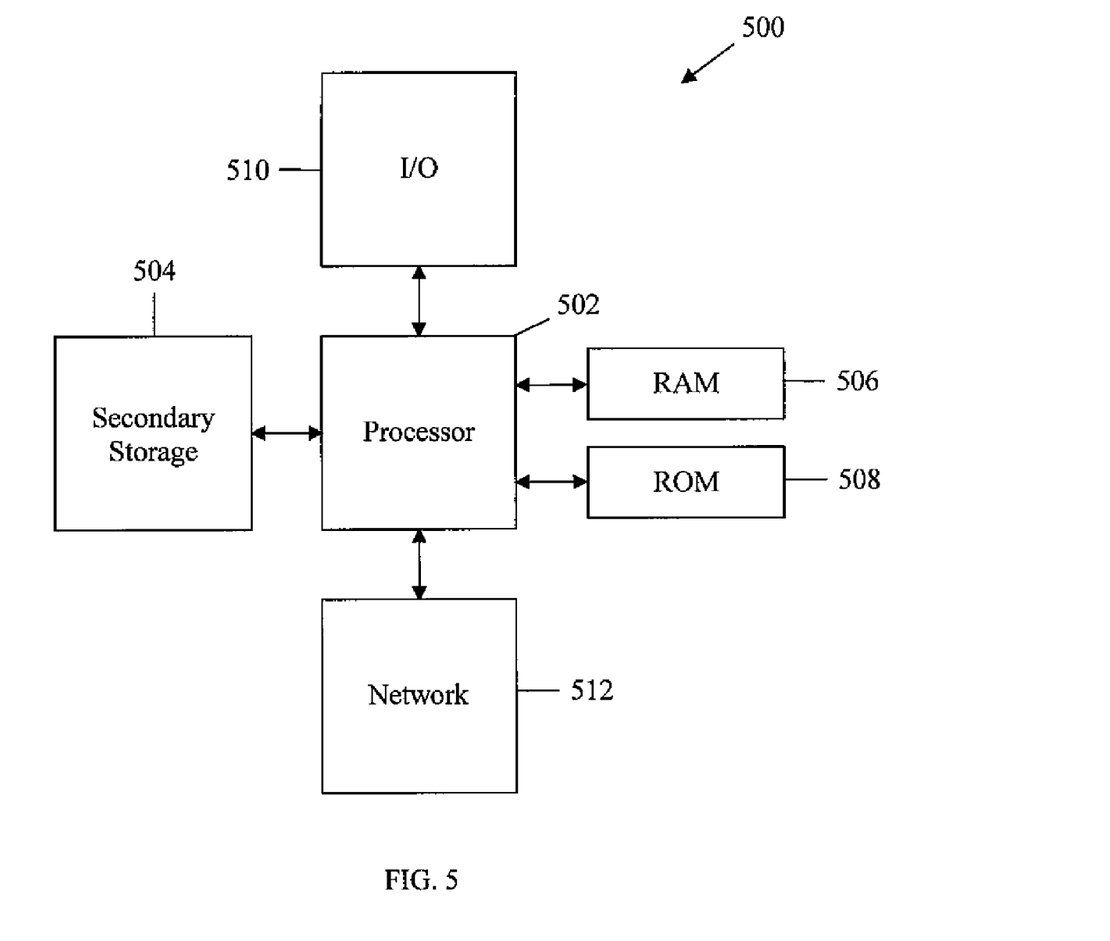
FIG. 5 is a schematic diagram of an embodiment of a general-purpose network component.

The network components described above may be implemented on any general-purpose network component, such as a computer or network component with sufficient processing power, memory resources, and network throughput capability to handle the necessary workload placed upon it. FIG. 5 illustrates a typical, general-purpose network component 500 suitable for implementing one or more embodiments of the components disclosed herein. The network component 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips, or may be part of one or more application specific integrated circuits (ASICs).

The secondary storage 504 is typically comprised of one or more disk drives or tape drives and is used for non-volatile storage of data and as an over-flow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. A system comprising:
   a packet-aware transport box configured to establish and tear down a transparent bypass for a data path managed by a router by snooping on the data path's path control messages, snoop a plurality of frames associated with the data path and intended for the router, determine whether at least some of the frames should bypass the router, and forward any frames that should bypass the
router to the transparent bypass,
wherein the forwarding does not substantially impact a
condition of the data path,
wherein the path control messages comprise multi-protocol label switching (MPLS) control protocol data units (PDUs),
wherein the packet-aware transport box is configured to create the transparent bypass after snooping a complete set of path reservation and confirmation messages among the router and one or more second routers, and
wherein the router and the second routers control the data path.

2. The system of claim 1, wherein the packet-aware transport box is configured to provide a link between the router and a second router.

3. The system of claim 1, wherein the packet-aware transport box is configured to determine whether at least some of the frames should bypass the router by manual configuration.

4. The system of claim 1, wherein the packet-aware transport box is configured to separate any data frames that should bypass the router from any remaining data frames.

5. A system comprising:
a packet-aware transport box configured to establish and tear clown a transparent bypass for a data path managed by a router by snooping the data path's path control messages, snoop a plurality of frames associated with the data path and intended for the router, determine whether at least some of the frames should bypass the router, and forward any frames that should bypass the router to the transparent bypass,
wherein the forwarding does not substantially impact a condition of the data path,
wherein the path control messages comprise multi-protocol label switching (MPLS) control protocol data units (PDUs), and
wherein the packet-aware transport box is configured to cease forwarding of the frames to the transparent bypass and/or subsequently remove the transparent bypass when a path maintenance message is not received within a predetermined time interval, when a path termination message is received, or when instructed to cease forwarding the frames to the transparent bypass by a network operator.

6. A system comprising:
a packet-aware transport box configured to establish and tear down a transparent bypass for a data path managed by a router by snooping on the data path's path control messages, snoop a plurality of frames associated with the data path and intended for the router, determine whether at least some of the frames should bypass the router, and forward any frames that should bypass the router to the transparent bypass,
wherein the forwarding does not substantially impact a condition of the data path, and
wherein the packet-aware transport box is configured to determine whether a transparent bypass should be established for a data path by receiving a command from an external path computation element (PCE).

7. The system of claim 6, wherein the PCE comprises a higher layer PCE and a lower layer PCE, and wherein the higher layer PCE consults the lower layer PCE for lower layer topology information.

8. The system of claim 7, wherein the lower layer is a packet transport network layer, an optical transport network layer, or a wavelength division multiplexed layer.

9. A system comprising:
a packet-aware transport box configured to establish and tear down a transparent bypass for a data path managed by a router by snooping on the data path's path control messages, snoop a plurality of frames associated with the data path and intended for the router, determine whether at least sonic of the frames should bypass the router, and forward any frames that should bypass the router to the transparent bypass,
wherein the forwarding does not substantially impact a condition of the data path,
wherein the packet-aware transport box is configured to provide a link between the router and a second router, and
wherein the packet-aware transport box is configured to determine that none of the frames should bypass the router when a fault is detected in a port associated with the frames.

10. A method comprising:
configuring a bypass path by snooping a control frame comprising a label switched path (LSP) identifier;
routing a plurality of data frames associated with the LSP identifier to the bypass path without routing any subsequent control frames associated with the LSP identifier to the bypass path; and
disabling the bypass path when a fault is detected in a port associated with the bypass path.

11. The method of claim 10, wherein the control frame is distributed using label discovery protocol.

12. A network comprising;
a first Provider Edge (PE) router configured to transmit a control frame and a first plurality of data frames, wherein the first plurality of data frames are associated with a data path;
a second PE router configured to receive the control message and the plurality of data frames;
a core router positioned between the first PE router and the second PE router, wherein the core router is configured to:
receive the control frame from the first PE router;
forward the control frame to the second PE router; and
establish the data path pursuant to the control message, wherein the data path extends from the first PE router to the second PE router via the core router; and
a packet-aware transport box straddling the core router, wherein the packet aware transport box is configured to:
receive and transparently snoop the control frame;
establish a transparent bypass pursuant to the control frame, wherein the transparent bypass circumvents the core router but does not otherwise deviate from the data path;
receive and snoop the first plurality of data frames, wherein the first plurality of data frames are associated with the data path; and
forward the first plurality of data frames on the transparent bypass.

13. The network of claim 12, wherein the first plurality of data frames are not switched by any intervening core routers when forwarded on the transparent bypass.

14. The network of claim 12, wherein the packet aware transport box forwards the first plurality of data frames on the transport bypass in response to a traffic volume of the core router exceeding a threshold.

15. The network of claim 12, wherein the packet aware transport box is further configured to disable the transport bypass upon detecting a fault on the transport bypass.

16. The network of claim 15, wherein no data frames are forwarded on the transparent bypass subsequent to disabling of the transparent bypass by the packet aware transport box.

17. The network of claim 12, wherein no control frames are forwarded on the transparent bypass.

18. The network of claim 12, wherein forwarding the first plurality of data frames on the transport bypass occurs at Open Systems Interconnection model (OSI) layer one, and wherein either the first plurality of frames comprise a statistically multiplexed packet header or the path comprises one of a fiber, a wavelength, a Synchronous Optical Networking (SONET) path, a Synchronous Digital Hierarchy (SDH) path, or an optical transport network (OTN) path.

19. The network of claim 12, wherein forwarding the first plurality of frames on the transport bypass occurs at Open Systems Interconnection model (OSI) layer two, and wherein the path comprises an Ethernet Switched Path (ESP) in a virtual local area network (VLAN) or a Label Switched Path (LSP).

20. The network of claim 12, wherein the first PE router is further configured to transmit a second plurality of data frames that are associated with the data path,
- wherein the packet aware transport box is further configured to forward the second plurality of data frames to the core router without diverting any of the second plurality of data frames on the transport bypass,
- wherein the core router is further configured to forward the second plurality of data frames to the second PE router, and
- wherein, from the perspective of the second PE router, the first plurality of data frames and the second plurality of data frames traverse the network on identical paths,
- wherein the first plurality of data frames are sent during a first period,
- wherein the second plurality of data frames are sent during a second period, and
- wherein a traffic volume of the core router exceeds a threshold during the first period but not during the second period.

* * * * *

UNITED STATES PATENT AND TRADEMARK OFFICE
CERTIFICATE OF CORRECTION

PATENT NO.        : 8,050,270 B2                                      Page 1 of 1
APPLICATION NO.   : 12/431650
DATED             : November 1, 2011
INVENTOR(S)       : Linda Dunbar et al.

It is certified that error appears in the above-identified patent and that said Letters Patent is hereby corrected as shown below:

Column 9, line 26 should read "tear down a transparent bypass for a data path managed"

Column 10, line 7 should read "whether at least some of the frames should bypass the"

Signed and Sealed this
Twentieth Day of December, 2011

David J. Kappos
*Director of the United States Patent and Trademark Office*